Oct. 27, 1964

L. H. JOHNSON 3,154,760

SEISMIC PROSPECTING SYSTEM

Filed May 15, 1953

LENARD H. JOHNSON,
INVENTOR

BY
Reed & Lawler
ATTORNEY.

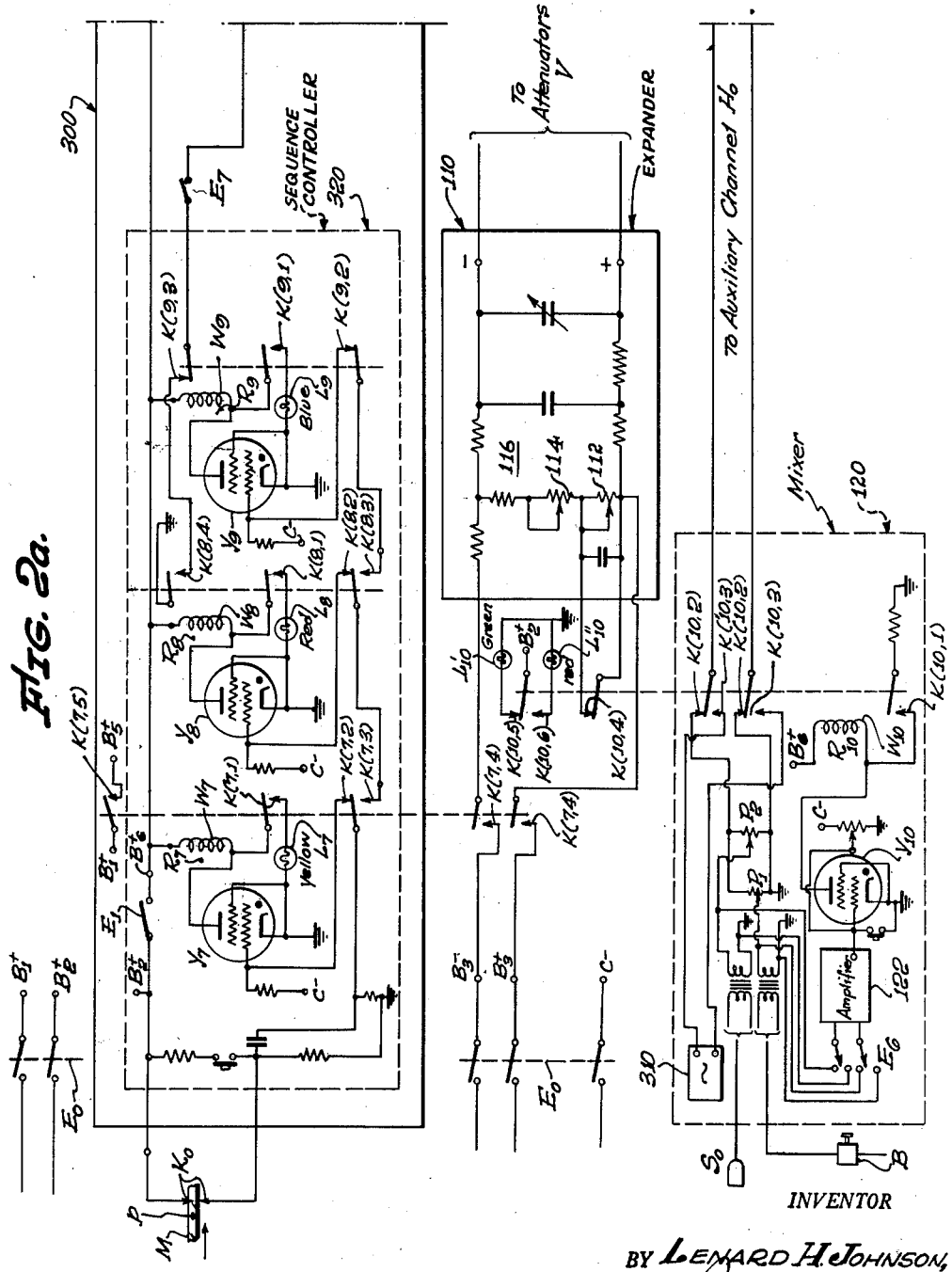

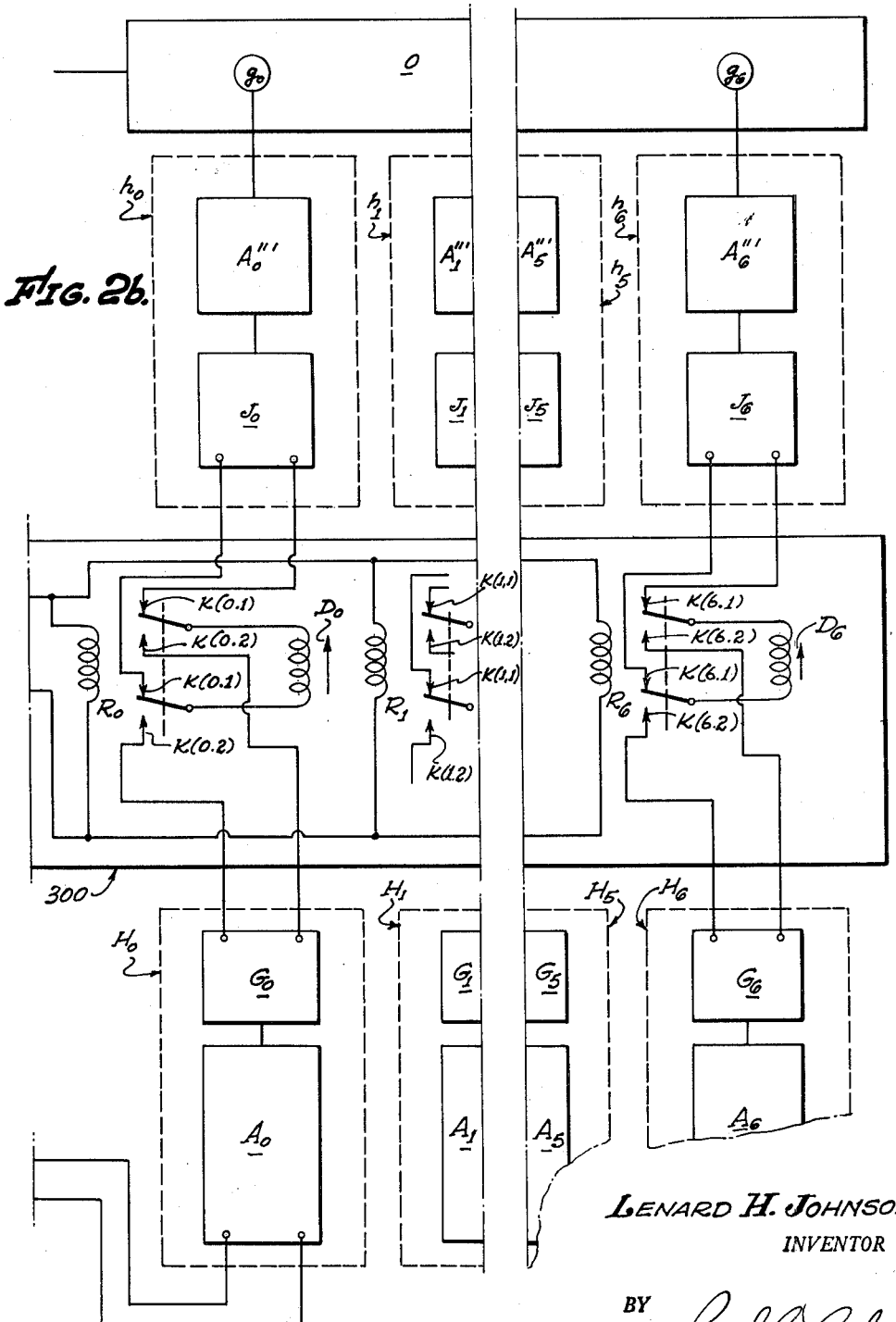

Oct. 27, 1964
L. H. JOHNSON
3,154,760
SEISMIC PROSPECTING SYSTEM
Filed May 15, 1953
5 Sheets-Sheet 4
FIG. 3.
FIG. 4.
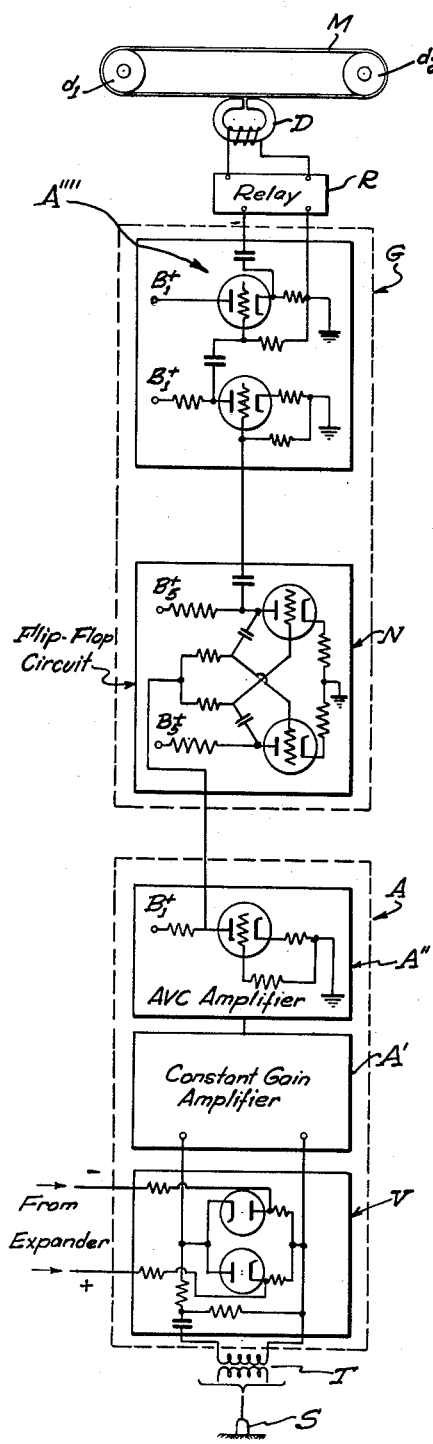
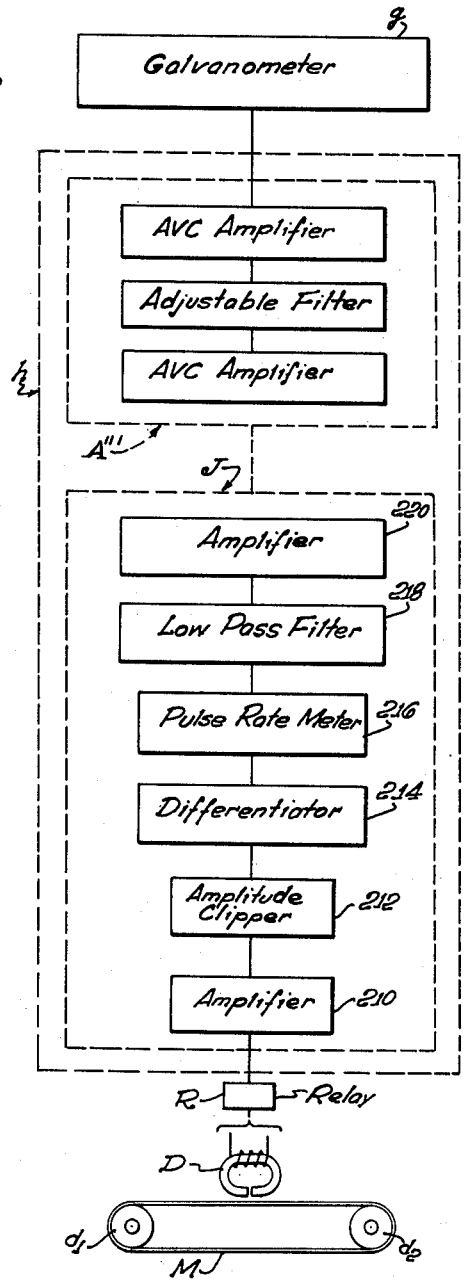
INVENTOR.
BY LENARD H. JOHNSON,
ATTORNEY.

United States Patent Office 3,154,760
Patented Oct. 27, 1964

3,154,760
SEISMIC PROSPECTING SYSTEM
Lenard H. Johnson, Pasadena, Calif., assignor, by mesne assignments, to United Geophysical Corporation, Pasadena, Calif., a corporation of California
Filed May 15, 1953, Ser. No. 355,374
8 Claims. (Cl. 340—15.5)

This invention relates to seismic prospecting and more particularly to methods for recording and reproducing seismic waves.

In reflection seismic prospecting as generally practiced, a charge of explosive is detonated at a shothole, causing seismic waves to travel outwardly therefrom in all directions. Some of these waves are refracter and reflected by underlying formations, thereby being returned to the surface of the earth where they are received by seismometers and converted into corresponding electrical waves. In effect, a train of seismic waves is received at each seismometer and is converted into a train of corresponding electrical waves.

As is well known, it is often desirable to record seismic waves in limited frequency bands in order to eliminate undesirable seismic waves or extraneous seismic disturbances and to emphasize certain seismic waves which are valuable in determining the structure of the subsurface formations. Sometimes only one shot is fired in a shothole because the shothole collapses after the first shot. It is therefore highly desirable to produce a record of all seismic waves received from that one shot and to subsequently reproduce from that single record seismic waves in limited frequency bands. For this and other reasons, it is desirable to record seismic waves in such a form that they can be reproduced and filtered in any desired way.

In one method of recording seismic waves, the waves are recorded on a continuous or endless record strip, such as a magnetic tape, in the form of a closed loop. Such a loop is formed by splicing together the ends of an elongated strip. Even though the original strip may be uniform and homogeneous throughout its length, the splice so formed constitutes a local inhomogeneity that may seriously interfere with the recording.

In recording waves on such an endless loop, it is desirable to avoid any overlapping of the tracks with the splice. If such overlapping occurs, the record may be lost in an important section thereof. Furthermore, the splice may so react with the recording element as to disable it in some fashion, thereby preventing the making of accurate records for a substantial period. More specifically, when a magnetic tape is employed, it is desirable to use magnetic heads for recording. Such magnetic heads are provided with small gaps adjacent the record strip. For example, the gaps may be only about 0.0005 inch wide. The gap formed by the splice may be about 0.10 inch wide or there may be an overlap. Narrow gaps are employed in the magnetic heads in order that the lengths of the magnetic tapes will not become unduly great and yet no matter whether the splice is in the form of a butt joint or lap joint, it is likely to interfere with the recording. One reason for this is that it may be difficult to maintain the magnetic tape sufficiently close to the magnetic heads as the splice passes them to produce a satisfactory record for a substantial period after the splice has passed the magnetic head.

One object of the invention is to overcome the foregoing difficulties.

Another object of the invention is to provide an improved system for recording seismic waves that is convenient to use and positive in operation.

Another object of the invention is to provide an improved system for recording reproducible records of seismic waves over a broad band of frequencies.

Another object of the invention is to provide an improved system for reproducing seismic waves from a reproducible record.

Another object of the invention is to provide an arrangement for automatically operating various control elements of a seismic wave recording system in timed relationship with the passage of a predetermined portion of the record strip past the recording elements.

Another object of the invention is to provide a system which indicates when a splice in an endless record strip passes the recording elements.

Another object is to provide an arrangement for operating the recorder only during a single passage of a record strip past the recording elements without the record overlapping a splice in the record strip.

The foregoing and other objects of the invention will be apparent from a study of the following specification, read in connection with the accompanying drawings, in which:

FIGS. 2a and 2b are second diagrams of the system illustrating various parts thereof in detail;

FIG. 3 is a schematic diagram of a recording channel;

FIG. 4 is a schematic diagram of a reproducing system;

FIGS. 2a and 2b are assembled; and

Figure 1:
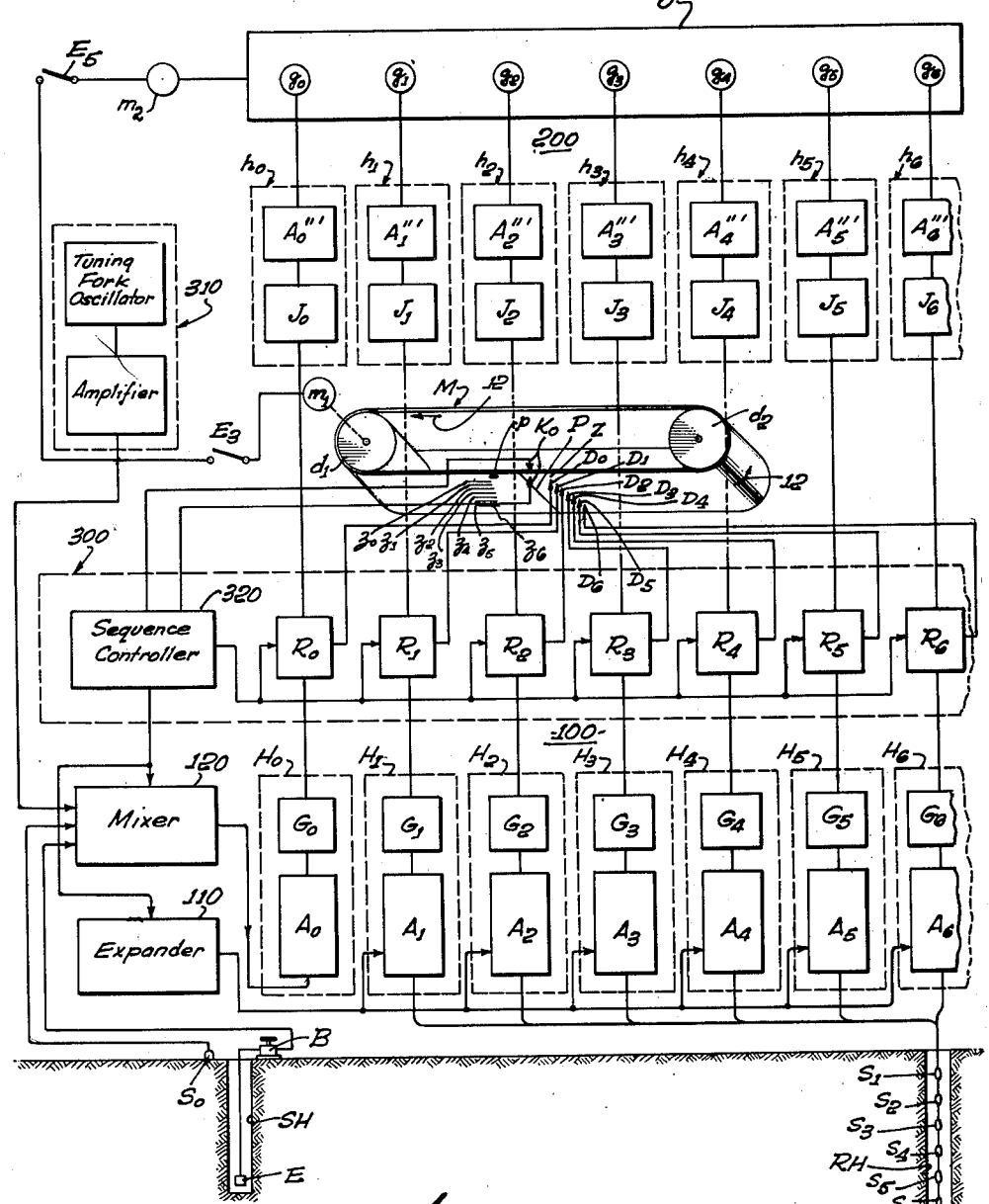
FIG. 1 is a schematic diagram of a recording and reproducing system of this invention.
Figure 5:
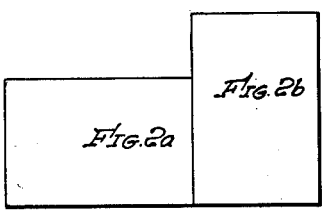
FIG. 5 is a composite diagram showing how

A seismograph recording and reproducing system embodying features of this invention includes three main parts as shown in FIG. 1, namely, a seismic wave recorder 100, a seismic wave reproducer 200 and a control unit 300. According to this invention, seismic waves received at a plurality of spaced points in the earth are recorded as reproducible tracks on a continuous record belt M and are subsequently reproduced therefrom and rerecorded to form oscillograph traces by means of a multiple-element oscillograph O, the same transducing devices D being employed for recording the tracks on the record M and for reproducing them so as to form the traces.

In this specification the invention is explained with reference to the reflection seismic prospecting system of the type described and claimed in copending patent application Serial No. 319,969, filed by Raymond A. Peterson, November 12, 1952. As shown in FIG. 1 hereof a charge of explosive E is located at the bottom of a shot hole SH and a series of seismometers in the form of hydrophones $S_1 \ldots S_6$ are arranged in a vertical line in a receiver hole RH some distance from the shot hole SH. An uphole seismometer $S_0$ is mounted at the top of the shot hole SH. In using such a system the charge of explosive E is detonated by operation of blaster B. In the present invention the seismic waves thereafter received at the various seismometers $S_0, S_1 \ldots S_6$ are recorded on a reproducible record and are then subsequently reproduced.

The seismic wave recorder 100 comprises a plurality of channels $H_1 \ldots H_6$ having their respective inputs connected to seismometers $S_1 \ldots S_6$ and their respective outputs connectable to the respective transducing heads $D_1 \ldots D_6$. The recorder 100 also includes auxiliary channel $H_0$ which has an input connected to a mixing unit 120 and its output connectable to a transducing head $D_0$.

The seismic wave reproducer 200 comprises a corresponding series of reproducing channels $h_1 \ldots h_6$ having their respective inputs connectable to the transducing heads $D_1 \ldots D_6$ and their outputs connected to recording elements $g_1 \ldots g_6$ in the form of galvanometers of the multiple-element oscillograph O. The reproducer 200 also includes an auxiliary reproducing channel $h_0$ having an input connectable to the auxiliary transducing device $D_0$ and its output connected to an auxiliary element $g_0$ in the form of a galvanometer of the oscillograph O.

The record belt M is mounted on a driving drum or wheel $d_1$ and a driven or idler drum or wheel $d_2$. The driving drum $d_1$ is arranged to be driven continuously by a synchronous motor $m_1$, thereby moving the belt M continuously and repeatedly along a closed path 12 at a substantially constant speed. The record belt M is divided into a series of parallel longitudinal zones which form tracks $z_0, z_1 \ldots z_6$ which travel past the transducing devices $D_0, D_1 \ldots D_6$ as the belt is driven by the motor $m_1$ in the direction indicated by the arrows 12.

The transducing devices $D_0, D_1 \ldots D_6$ are mounted in a transducing area Z adjacent the surface of the record belt. The transducing devices may be arranged along a straight line transverse to the length of the belt, or they may be arranged in echelon, or in some other desired, pattern according to the needs of the operator. However, for simplicity, it is assumed hereinafter that the transducing heads are arranged along a straight line transverse to the path 12.

In the embodiment of the invention specifically described herein, the record belt M is in the form of a strip which is uniformly coated externally with a material which is adapted to retain or "remember" magnetic fields impressed thereon. Such a record belt is known as a magnetic tape. Also in this embodiment of the invention, the transducing heads $D_0, D_1 \ldots D_6$ are in the form of magnetic heads which are adapted to impress magnetic fields upon such a coating and which are also adapted to detect any residual magnetism retained by such coating.

In order to form the endless record belt M, the ends of a strip of record material are spliced together, either by means of adhesive paper, or otherwise. Either a butt joint or a lap joint may be formed at the splice P. In either event, when the splice P passes the transducing devices D, the splice is likely to interact with the transducing devices $D_0, D_1 \ldots D_6$ either mechanically or magnetically in such a way as to disturb the recording or reproduction of the waves.

The record belt M is provided with a marker in the form of perforation $p$ which is employed to operate the control unit 300 in such a way as to prevent such disturbances and to limit the time of recording to the period required for the record belt M to make one complete revolution in its path 12.

Each of the recording channels H comprises an input transformer T connected to a seismometer S, an amplifier A and a frequency-modulated generator G connected in the order named as illustrated in FIG. 3. Each of the amplifiers A comprises a variable attenuator V, a first amplifier section A' and a second amplifier A". For convenience hereinafter the attenuators V are sometimes considered as part of the first amplifier sections A', especially when reference is made to the gain of these amplifier sections. The amplifiers A have broad-band characteristics, being adapted to amplify waves uniformly throughout a wide band of frequencies of interest in seismic prospecting such as a band extending from 5 c.p.s. to 300 c.p.s. A relay R forming part of the control unit 300 is connected between the output of each of the channels H and the corresponding magnetic head D.

In this application, the subscripts 0, 1 . . . 6 are applied to identical parts in the different channels and the subscripts are frequently omitted when the description applies equally to identical parts in the respective channels. Sometimes though subscripts are also employed to distinguish different similar parts all of which are associated with all of the channels.

The control unit 300 is provided with a plurality of channel relays $R_0 \ldots R_6$ which are adapted to connect the magnetic heads $D_0 \ldots D_6$ selectively to the outputs of the respective recording channels $H_0 \ldots H_6$ or to the inputs of their respective reproducing channels $h_0 \ldots h_6$.

When the relays $R_0 \ldots R_6$ are operated, the magnetic heads $D_0 \ldots D_6$ are connected to the outputs of the recording channels $H_0 \ldots H_6$ and when the relays $R_0 \ldots R_6$ are restored, the magnetic heads are connected to the respective reproducing channels $h_0 \ldots h_6$.

As shown in FIG. 1 and FIG. 3 the seismic-wave recorder 100 includes an expander 110 for controlling the attenuation produced by the respective attenuators $V_1 \ldots V_6$ as a predetermined function of time. The seismic-wave recorder 100 also includes a mixer 120 which is adapted to supply to the input of the auxiliary recording channel $H_0$ various signals including a time break produced by a blaster B, a first break FB produced by an uphole seismometer $S_0$ and a timing signal TS supplied from the oscillator 310.

The attenuators V are of a type which attenuate waves transmitted therethrough to a degree that varies inversely as the value of a voltage applied thereto, the degree of attenuation decreasing as the applied voltage increases. The expander 110 is of a type which is adapted to provide the desired voltage that increases as a predetermined function of time, thereby gradually reducing the attenuation produced by the attenuators V. In effect, the expander increases the gain of each of the first amplifier sections A' as a predetermined function of time.

Each of the second amplifier sections A" is part of an AVC loop. Such an amplifier section tends to limit the amplitude of the signal at its output to a predetermined AVC level, but since such an AVC loop possesses both an attack time and a recovery time, a short-time variation in the amplitude of the signal applied to the input thereof causes corresponding variations at the output thereof. Since this makes it possible to record seismic waves rather faithfully over a period of several cycles or wave lengths, the waves recorded on the tracks aid in the identification and correlation of seismic waves reflected from various portions of a subsurface stratum to the seismometers $S_1 \ldots S_6$ that are connected to the inputs of the various channels $H_1 \ldots H_6$.

Each of the frequency-modulated generators G is of a type which generates at its output a square wave that is of constant amplitude but of variable frequency. The frequency-modulated generator G produces at its output a wave having a frequency that deviates from a reference frequency by an amount $\Delta f$ proportional to the amplitude of the voltage applied to its input. As shown in FIG. 3, the frequency-modulated generator G employed is in the form of a flip-flop circuit N which produces square waves at a frequency that deviates from a reference frequency by an amount proportional to the voltage impressed on its grid circuits. The voltage in this case is supplied from the output of the corresponding recorder amplifier A. An isolation network comprising an amplifier A having a cathode follower in the output stage prevents interaction between the magnetic head and the corresponding modulator G when relays are being switched. The output impedance of the cathode follower stage of amplifier A'''' is small compared with the impedance of the associated magnetic head D. The amplitude of the pulses impressed upon the head D is sufficient to saturate the record magnetically even though it may have been previously saturated in the opposite direction. In practice, according to the present invention, the amplitude of the output of the frequency-modulated generator is sufficiently high to saturate the tracks produced on the magnetic record M in opposite directions in alternate half cycles.

When the outputs of the recording channels $H_0 \ldots H_6$ are connected to the magnetic heads $D_0 \ldots D_6$, waves are recorded along the tracks formed in the various zones $z_0 \ldots z_6$. The waves are of substantially constant amplitude in view of the saturation of the magnetic material that is on the surface of the tape. If no signals are being applied to the inputs of the respective channels $H_0 \ldots H_6$, waves of a constant frequency equal to the reference frequency of the generators $G_0 \ldots G_6$ are recorded on the tracks. In practice, the frequency-modulated generators are designed to operate at some predetermined frequency, say about five thousand cycles per second, and the generator is adapted to vary in frequency by as much as ten percent when the amplitude at the output of the corresponding channel H reaches its AVC level. When signals are applied to the inputs of the channels $H_0 \ldots H_6$, the spacing between successive magnetized areas along the tracks is inversely proportional to the frequencies applied thereto.

The reproducing channels $h_0 \ldots h_6$ comprise demodulators $J_0 \ldots J_6$ and amplifiers $A_0''' \ldots A_6'''$. If the magnetic heads $D_0 \ldots D_6$ are connected to the inputs of the reproducer channels $h_0 \ldots h_6$, then when the tape travels past the heads $D_0 \ldots D_6$, the signals on the tracks $z_0 \ldots z_6$ cause pulses to be applied to the inputs of the reproducing channels $h_0 \ldots h_6$. The frequency of the pulses applied at any time equals the frequency produced by the generator G in the recording of the corresponding track.

Each demodulator J is of a kind which produces at its output voltages proportional to the deviations in the frequency applied thereto from the reference frequency. These voltages are then passed through the amplifiers $A_0''' \ldots A_6'''$ of the reproducing channels and the amplified voltages are applied to the galvanometers $g_0 \ldots g_6$ of the multiple-element oscillograph. Thus, the reproducer 200 is adapted to convert variable frequency magnetic tracks recorded on the magnetic tape M by the recorder 100 into variable amplitude oscillograph traces.

More particularly as shown in FIG. 4, each of the demodulators J comprises an input amplifier 210, an amplitude clipper 212, a differentiator 214, a pulse rate measuring device 216, a low-pass filter 218, and an output amplifier 220, all connected in the order named. The input impedance of the input amplifier 210 is high compared to the impedance of the magnetic head to which it is connectable. The purpose of this amplifier is simply to amplify the pulses picked up by the head to a high degree. These pulses are then supplied to the clipper 212 where their peaks are cut off, thereby producing substantially square waves. The differentiator 214 is in the form of a differentiating network which responds to the rate of change of voltage supplied to its input, producing positive or negative pips at its output according to whether the change of voltage applied to its input is in one direction or the other. The frequency, or repetition rate of the pips is the same as the frequency of the square waves applied to the input of the demodulator and, hence, proportional to the frequency of the recorded waves. The pulse rate meter 216 may be of any suitable type that produces at its output a voltage proportional to the frequency of the pulses applied to its input. Such a rate meter may comprise a thyratron which is ignited each time a pip is applied to its grid and which is connected to produce a specific amount of charge in an output circuit each time it is fired. Consequently, the wave appearing at the output of the pulse rate measuring device includes a component proportional to the voltages that were originally employed to modulate the corresponding frequency-modulated generator G with saw-tooth ripples thereon of the same frequency as the frequency of the pulses applied to its input. The frequency of the saw-tooth ripples superposed thereon is, however, very high, being equal to the frequency of the pulses.

The low-pass filter 218 has a cut-off between the highest seismic wave frequencies of interest and the frequency of the lowest frequency waves that are produced by the frequency modulated generator G. Thus, for example, the low-pass filter 218 may have a cut-off at about five hundred cycles per second. Consequently, when the output of the pulse rate meter 216 is passed through the filter 218, a wave is produced that is a replica of the signal that modulated the corresponding generator G. This wave then contains all the components of the seismic waves passed through the corresponding amplifiers A.

The amplifiers $A'''$ contain adjustable filters for selectively amplifying components of the waves impressed on their inputs. These amplifiers may also be of the AVC type in order to limit the amplitude of the traces produced in the oscillograph O to an amplitude range suitable for study of both the relatively large and the relatively small waves.

According to the present invention, the relays $R_0 \ldots R_6$ are so operated that a record is taken only during a period when the splice P is outside the transducing area. Furthermore, in accordance with the present invention, the expander 110 is operated automatically to vary the gain of the first amplifier sections A' of the various channels H according to a desired function of time during the period when the tracks are being recorded on the record belt M. Also, according to this invention, the mixer 120 is so operated as to impress upon the input of the auxiliary channel $H_0$ signals which permit recording of the time break and the uphole time and a timer track which aids in determining the exact instants of arrival of seismic waves at the various seismometers $S_1 \ldots S_6$. Also, in accordance with the present invention, a common generator 310 is employed to drive the synchronous motors m and $m_1$ and to produce the timing lines on the reproducible record.

As shown in FIGS. 1 and 2a, a sequence controller 320 is actuated by the marker p to indicate when the splice P is in the transducing zone Z and to render the relays $R_0 \ldots R_6$ operative to record seismic waves on the magnetic tape M only during a time interval when the splice P is outside the transducing area. A detector element in the form of a switch has a pair of contacts $K_0$ normally urged toward each other. The contacts are located on opposite sides of the magnetic tape M at a position adjacent the transducing zone Z. The distance between the detector element and the transducing zone Z is about equal to the distance between the marker p and the splice P. Furthermore, the detector element is located in such a direction from the transducing zone Z that the contacts $K_0$ close when the splice P approaches or enters the transducing zone Z. Thus, with this arrangement, in each revolution of the belt, the perforation p enters the gap between the contacts $K_0$ when the splice P is in such a position as to disturb the making or reproduction of a record.

Each time the contacts $K_0$ close, an electrical pulse is applied to the input of the sequence controller 320.

In order to provide the desired indications, controller 320 comprises three sequence relays $R_7$, $R_8$, and $R_9$ as shown in FIG. 2a. In order to distinguish between contacts of the various relays, the contacts are specified hereinafter by the symbol $K(a, b)$ where a is the subscript of the corresponding relay $R_a$ with which the contacts are associated and b is an ordinal number employed to distinguish one pair of contacts of a relay from another in the same relay. Three thyratron tubes $Y_7$, $Y_8$, and $Y_9$ are associated, respectively, with the three relays $R_7$, $R_8$, $R_9$ of the sequence controller 320. The thyratrons are normally rendered inoperative by a $C^-$ bias applied to their grids from a suitable source of power $C^-$.

The first sequence relay $R_7$ comprises normally open sticking contacts $K(7, 1)$, normally closed contacts $K(7,$ 2), normally open contacts K(7, 3) and two sets of normally open contacts K(7, 4) and normally open contacts K(7, 5). Voltage is supplied through solenoid winding $W_7$ of relay $R_7$ to the anode of the first sequence thyratron $Y_7$. The anode is also connected to a sticking circuit including contacts K(7, 1) and a yellow "CONTACT" light $L_7$.

The second sequence relay $R_8$ comprises normally open sticking contacts K(8, 1), normally closed contacts K(8, 2), normally open contacts K(8, 3) and normally open contacts K(8, 4). Voltage is supplied through solenoid winding $W_8$ of relay $R_8$ to the anode of the second sequence thyratron $Y_8$. The anode is also connected to a sticking circuit including contacts K(8, 1) and a red "FIRE" light $L_8$.

The third sequence relay $R_9$ comprises normally open, sticking contacts K(9, 1) and normally closed contacts K(9, 2) and contacts K(9, 3). Voltage is supplied through solenoid winding $W_9$ of the relay $R_9$ to the anode of the third sequence thyratron $Y_9$. The anode is also connected to a sticking circuit comprising contacts K(9, 1) and a blue "STOP" light $L_9$.

Each of the channel relays $R_a$ associated with a magnetic head $D_a$ is provided with a pair of normally closed contacts K($a$, 1) and a pair of normally open contacts K($a$, 2). The corresponding magnetic heads $D_a$ are arranged to be connected to the input of the corresponding reproducing channel $H_a$ when the first pair of contacts K($a$, 1) are closed, that is, when the corresponding channel relay $R_a$ is restored; and to the outputs of the corresponding recording channels $H_a$ when the second pair of contacts K($a$, 2) are closed, that is, when the corresponding channel relay $R_a$ is operated.

Various parts of the apparatus are energized by closure of a power switch $E_0$. More particularly, when the power switch $E_0$ is closed, the $C^-$ bias is applied to the various thyratrons $Y_7$, $Y_8$, $Y_9$, and $Y_{10}$. Also, when the power switch $E_0$ is closed a high voltage of about one hundred or two hundred volts is applied to the various amplifiers and the like through terminal $B_1^+$. A low B+ voltage of about twenty-four volts is applied to the detector contacts $K_0$ through terminal $B_2^+$ and is available to energize the thyratrons $Y_7$, $Y_8$, and $Y_9$ through a ready switch $E_1$ when closed. A record-reproducer switch $E_7$ is arranged between the output of sequence controller 320 and the channel relays $R_0$ . . . $R_6$.

The mixer 120 comprises a relay $R_{10}$ having a thyratron $Y_{10}$ associated therewith. When the power switch $E_0$ is closed, B+ voltage is applied from voltage terminal $B_6^+$ to the anode of the thyratron $Y_{10}$ through the winding $W_{10}$ of relay $R_{10}$. Relay $R_{10}$ comprises normally open contacts K(10, 1), a pair of normally closed contacts K(10, 2), a pair of normally open contacts K(10, 3), normally closed contacts K(10, 4), normally closed contacts K(10, 5), and normally open contacts K(10, 6).

The normally closed contacts K(10, 1) are included in a sticking circuit, between the anode of thyratron $Y_{10}$ and ground.

The pair of normally closed contacts K(10, 2) is connected to a pair of potentiometers $p_1$ and $p_2$. The output from a blaster B is applied to potentiometer $p_1$ and the output from the uphole seismometer $S_0$ is applied to the second potentiometer $p_2$. With this arrangement, any desired fractions of the signals from the blaster and from the uphole seismometer $S_0$ appear across the potentiometers $p_1$ and $p_2$. The pair of normally open contacts K(10, 3) are connected to the fifty cycle per second generator 310.

When the first pair of contacts K(10, 2) is closed, the mixed output appearing across the potentiometers $p_1$ and $p_2$ is applied to the input of the auxiliary channel $H_0$. When the other pair of contacts K(10, 3) is closed, the output from the fifty cycle generator 310 is applied to the input of the auxiliary channel $H_0$.

The normally open contacts K(7, 4) are arranged in the line between the $B_3^+$ and $B_3^-$ terminals and the input to the expander 110 which includes series-connected control resistors 112 and 114. Normally closed contacts K(10, 4) are connected across one control resistor 112.

One of control resistors 112 is arranged to be short-circuited initially and subsequently to be unshorted. When in the shorted condition a relatively low voltage is applied to the attenuators V and the effective gains of the first amplifier sections A' are relatively low, but when the control resistor 112 is unshorted, the voltage applied to the attenuators V gradually increases, thereby gradually increasing the effective gains of the first amplifier sections A' as a predetermined function of time. As is well known, the rate of increase of gain depends upon the time constants of the resistance capacitance networks 116 in the expander 110 and the initial and ultimate values of the gain depend upon the values of the control resistors 112 and 114.

When a record is to be made, the power switch $E_0$ and the motor switch $E_3$ and the record-reproducer switch $E_7$ are closed. All of the amplifiers A of the recorder are energized, but the frequency modulated generators G and the reproducing channels remain unenergized. Then ready switch $E_1$ is closed, preparing the sequence controller 320 for operation.

When the apparatus is thus in a ready condition, all relays $R_0$ . . . $R_{10}$ are restored and the thyratrons $Y_7$ . . . $Y_{10}$ are inactive, that is, non-conducting. The uphole seismometer $S_0$ and the blaster B are both connected to the input of the auxiliary channel $H_0$ through the contacts K(10, 2) of relay $R_{10}$. Furthermore, a power circuit completed through contacts K(10, 5) energizes a green light $L_{10}'$ indicating the restored condition of relay $R_{10}$. At this time, no voltage is applied to the expander 110 by virtue of the fact that contacts K(7, 4) are open. Also, at this time, all of the magnetic heads $D_0$ . . . $D_6$ are connected to the inputs of the corresponding reproducing channels $h_0$ . . . $h_6$ through the corresponding contacts K(0, 1) . . . K(6, 1). It should be noted that when the apparatus is ready, no power is applied to the channel relays $R_0$ . . . $R_6$ through the circuit including the switch $E_7$ and the contacts K(9, 3) and K(8, 4) because at this time the latter contacts K(8, 4) are in their restored condition in which they are open.

While the apparatus is in a ready condition as described above, the magnetic tape M is travelling continuously along its path 12. It will be noted at this point that the ready switch $E_1$ may be opened at any time to remove power from the circuits including all channel relays $R_0$ . . . $R_6$ and the controller relays $R_7$ . . . $R_9$ and the relay $R_{10}$ and that as will appear later, when the ready switch $E_1$ is open, no record can be made on the magnetic tape.

As indicated above, when the operator is ready to proceed with the making of a record on the magnetic tape M he closes the ready switch $E_1$ thus, energizing, or applying power to, the thyratrons $Y_7$ . . . $Y_{10}$. Thereafter, each time the perforation $p$ enters the gap between the contacts $K_0$, these contacts close, impressing a sharp positive pulse upon the input of the sequence controller 320.

When the detector contacts $K_0$ close the first time, a positive voltage pulse is applied to the grid circuit of the first thyratron $Y_7$ igniting it, thereby operating the first control relay $R_7$. When the relay $R_7$ operates, the sticking contacts K(7, 1) close, thereby applying power to the yellow "Contact" light $L_7$. At the same time contacts K(7, 4) close, applying power from the terminals $B_3^+$ and $B_3^-$ to the expander 110. As a result of the closure of the contacts K(7, 4) the various condensers in the expander 110 become charged to their initial voltage during the subsequent revolution of the magnetic tape M. Thus, during this revolution of the magnetic tape M, the gains of the first amplifier sections A' are brought to low values, thus preparing the recording channels $H_1$ . . . $H_6$ to receive and amplify first breaks without excessive overloading of the amplifiers in the channels.

Also, when the relay $R_7$ operates, contacts $K(7, 2)$ open and contacts $K(7, 3)$ close, disconnecting the input of the sequence controller 320 from the grid circuit of the first sequence thyratron $Y_7$ and connecting the input to the grid circuit of the second sequence thyratron $Y_8$ through the normally closed contacts $K(8, 2)$. As a result, the second sequence thyratron $Y_8$ and the second sequence relay $R_8$ are prepared for operation.

Also when the first sequence relay $R_7$ operates, contacts $K(7, 5)$ close energizing the frequency modulated generators G. As a result, these generators become stabilized at a reference frequency during the next revolution of the tape M.

The next time that the perforation $p$ enters the gap between the detector contacts $K_0$, a second pulse is applied to the input of the sequence controller 320. This pulse is applied through the contacts $K(7, 3)$ which are now closed and the normally closed contact $K(8, 2)$ to the grid circuit of the second sequence thyratron $Y_8$ causing it to ignite and operate the second sequence relay $R_8$.

When relay $R_8$ operates, sticking contact $K(8, 1)$ closes, igniting the red "FIRE" light $L_8$. At this same time contacts $K(8, 4)$ close, thereby operating all the channel relays $R_0 \ldots R_6$. When the channel relays $R_0 \ldots R_6$ operate, contacts $K(0, 1) \ldots K(6, 1)$ open and contacts $K(0, 2) \ldots K(6, 2)$ close, thereby disconnecting the magnetic heads $D_0 \ldots D_6$ from the inputs of the reproducing channels $h_0 \ldots h_6$ and connecting them to the outputs of the recording channels $H_0 \ldots H_6$.

Also, when the second sequence relay $R_8$ operates, contacts $K(8, 2)$ open and contacts $K(8, 3)$ close, thereby connecting the grid circuit of the third sequence thyratron $Y_9$ to the input of the sequence controller 320, thereby preparing both the thrid sequence thyratron $Y_9$ and the third sequence relay $R_9$ for operation. At the time that the ready light $L_8$ is illuminated, the operator of the recording truck signals a shooter at the blaster B to detonate the charge of explosive E. In practice the operator delays giving the signal for a short time such as by counting "one," "two," "three," "FIRE."

When the blaster B is operated, an electric signal is applied to the input of the auxiliary recording channel $H_0$ through the contacts $K(10, 2)$ modulating the output of the frequency modulated generator $G_0$, thereby energizing the corresponding transducing head $D_0$ producing a record on the track in the zone $z_0$.

As is well known, when the charge of explosive E is detonated, seismic waves travel outwardly in all directions therefrom. Some of these seismic waves travel directly to the uphole seismometer $S_0$ and others by direct and refracted paths to the remaining seismometers $S_1 \ldots S_6$. Subsequently, waves refracted and reflected from subsurface formations are returned toward the surface of the earth in the form of wave trains which reach the various seismometers $S_0 \ldots S_6$. Waves reflected from a common horizon may arrive successively at the respective seismometers $S_1 \ldots S_6$. The relative times of arrival of the waves are measured and employed to determine the structure of the underlying formations. In any seismic prospecting system, some means is provided for recording the waves received at the seismometers together with a timing trace and the resultant record is examined to determine the relative times of arrival of the waves in question.

When the seismic waves arrive at the uphole seismometer $S_0$, an electric wave generated by the seismometer is applied to the input of the auxiliary channel $H_0$ through the contacts $(K10, 2)$, again modulating the output of the frequency modulated generator $G_0$ and producing a corresponding indication or record on the track in the zone $z_0$.

Either at the time that the blaster B is operated or at the time that a seismic wave first arrives at the uphole seismometer $S_0$, as determined by the setting of a trip selector switch $E_6$, an electric wave is amplified by an amplifier 122 and applied to the grid circuit of the thyratron $Y_{10}$ causing it to ignite and operate the relay $R_{10}$. When the relay $R_{10}$ operates, sticking contacts $K(10, 1)$ close. At the same time contacts $K(10, 2)$ open and contacts $K(10, 3)$ close disconnecting the input of the auxiliary recording channel $H_0$ from the potentiometers $p_1$ and $p_2$ and connecting it to the output from the 50 cycle oscillator 310. Thereafter, the 50 cycle signal from the oscillator 310 is amplified by the auxiliary channel $H_0$, thus modulating the output of the frequency modulated generator $G_0$ at 50 c.p.s., thereby producing on the track in the zone $z_0$ a timing track record which may be employed to determine the relative times of arrival of waves at the various seismometers $S_1 \ldots S_6$. The selector switch $E_6$ has other contacts (not shown) allowing the selector switch $E_6$ to be set to ignite the thyratron $Y_{10}$ when a seismic wave is received by any one of the other seismometers $S_1 \ldots S_6$ or a separate seismometer placed at any desired position.

It will be noted that if the switch $E_6$ is set to prepare thyratron $Y_{10}$ and relay $R_{10}$ for operation by the signal from the blaster B, no record is made of waves arriving at the uphole seismometer S. Of course, if no uphole seismometer $S_0$ is employed, the potentiometer $p_2$ and the circuits leading to the uphole seismometer $S_0$ may be dispensed with.

In either event, since the motor M is driven at a constant speed, the instant of detonation of the charge may be ascertained by extrapolating the indications on the timer trace to the time break.

Also, at the time that the relay $R_{10}$ operates, contacts $K(10, 4)$ open, thereby increasing the voltage to which resistor capacitor networks 116 are ultimately charged. Thereafter, the effective gains of the input amplifier sections $A_1' \ldots A_6'$ increase as a predetermined function of time. It will be noted that the expansion of the gain starts at the time that the blaster B is fired or at the time that waves are first received at the uphole seismometer $S_0$ depending upon the setting of the trip selector switch $E_6$.

Also, at the time that the relay $R_{10}$ operates, contacts $K(10, 5)$ open and contacts $K(10, 6)$ close, thereby de-energizing the green indicator light $L_{10}'$ and energizing the red indicator light $L_{10}''$. In this way an indication is produced that the timer track is being recorded and the operation of the expander has been initiated.

It will be noted that the channel relays $R_0 \ldots R_6$ are connected to the outputs of the channel amplifiers $A_0 \ldots A_6$ only after the splice P has passed the transducing zone Z and that it is only then that the transducing heads $D_0 \ldots D_6$ are prepared for making records of the seismic waves received at the seismometers $S_1 \ldots S_6$. Thus, when the trains of seismic waves arrive at the seismometers $S_1 \ldots S_6$, electrical waves generated by the seismometers are impressed upon the inputs of the corresponding recording channels $H_1 \ldots H_6$. Initially the first amplifier sections $A_1' \ldots A_6'$ have low values of gain while the AVC amplifiers $A_1'' \ldots A_6''$ have high values of gain. As soon as seismic wave trains arrive at the respective seismometers the corresponding electrical waves generated by the seismometers are amplified by the corresponding amplifier sections $A'$ and $A''$, thereby producing large voltages at the outputs of the various amplifiers A, thus causing large deviations in the frequencies at the outputs of the respective frequency modulated generators G. Such large deviations as will become apparent hereinafter produce sharp first breaks.

As early waves of the respective wave trains arrive at the seismometers $S_1 \ldots S_6$, the gains of the output sections $A_1'' \ldots A_6''$ are reduced at a rather rapid rate by virtue the action of the AVC loops, thus causing the outputs of the AVC amplifiers to attain outputs near their normal AVC levels, subject to minor short-term variations corresponding to rapid changes in the amplitude of the seismic waves reflected or refracted from various subsurface formations. As seismic waves continue to arrive at the seismometers $S_1 \ldots S_6$ the gains of the input sections $A_1' \ldots A_6'$ increase to some extent compensating for the gradual attenuation of the energy in the seismic wave trains. Generally, the time constants of the expander 110 are so set as to limit the input to the AVC amplifier sections $A_1'' \ldots A_6''$ to the range of signals in which AVC action is effective. Consequently, except possibly for a large rapid increase in voltage occurring shortly after the first arrivals, the amplitudes of the waves supplied to the inputs of the frequency modulated generators $G_1 \ldots G_6$ are limited to a range in which the frequency modulation is linear, that is, to a range in which the deviation of frequency at the output of each frequency modulated generator G is proportional to the voltage impressed upon its input. Thus, while the seismic waves are being recorded, high fidelity frequency modulated tracks are produced in the respective zones $z_0 \ldots z_6$ of the magnetic tape M as it travels along its path 12 during the next revolution of the tape.

The next time that the perforation $p$ enters the gap between the contacts $K_0$ of the detector switch, a positive pulse is applied to the grid circuit of the third sequence thyratron $Y_9$, thereby operating the third sequence relay $R_9$.

When relay $R_9$ operates, sticking contacts $K(9, 1)$ close, thereby energizing the blue "STOP" light $L_9$. At the same time, contacts $K(9, 3)$ open, de-energizing and restoring the channel relays $R_0 \ldots R_6$. When the channel relays are restored, the magnetic heads $D_0 \ldots D_6$ are disconnected from the outputs of the recording channels $H_0 \ldots H_6$, thereby preventing any recording of any seismic waves subsequently received by the seismometers $S_1 \ldots S_6$. It will be understood that if such waves were recorded they would erase the waves previously recorded. The complete record so produced, continues to travel along its path 12.

Thereafter, at any time desired, the movement of the magnetic tape may be discontinued by opening the first motor switch $E_3$. Also, thereafter at any time, the remaining relays $R_7 \ldots R_{10}$ may be de-energized and restored and the associated thyratrons $Y_7 \ldots Y_{10}$ may be de-energized by opening the ready switch $E_1$. It will be noted that when the ready switch $E_1$ is now open, no change in the condition of the channel relays $R_0 \ldots R_6$ occurs, thereby holding the transducer heads $D_0 \ldots D_6$ disconnected from the output of the recording channels $H_0 \ldots H_6$ and connected to the inputs of the reproducing channels $h_0 \ldots h_6$. If the record produced is to be preserved, the motor $m$ is stopped and the record replaced.

But if it is desired to produce a second record without preserving the record already made, the operation described above is repeated. Briefly, the ready switch $E_1$ is closed and a charge of explosive E is detonated when the "FIRE" light $L_8$ is illuminated. Therefore, outputs of the frequency modulated generator applied to the transducing heads $D_0 \ldots D_6$ erase the prior record simultaneously with the production of the new record. Such simultaneous erase and recording is possible because the pulses applied to the heads saturate the portions of the record exposed to the magnetic fields of the heads.

Saturation of the magnetic tape by the fields produced by the heads is possible so long as the magnetic tape M is close to the heads. It is thus apparent that the fact that no recording occurs while the splice P is in the transducing zone Z not only produces a record free of any disturbance from the splice P, but also produces a record which may be readily erased by subsequently recording operations.

It is to be noted that if the amplitudes of the outputs of the various amplifiers in the recording channels $H_0 \ldots H_6$ are zero, nevertheless, a record is made corresponding to the reference frequency of the generators.

In any event, the record made on the magnetic tape M represents a faithful reproduction of the seismic waves received by the seismometers $S_1 \ldots S_6$ by virtue of the fact that broad-band amplifiers A are employed in the recording channels $H_1 \ldots H_6$. These records may then be reproduced by the seismic wave reproducer 200 and re-recorded by the oscillograph O. In reproducing a magnetic tape record, the amplifiers $A_1^v \ldots A_6^v$ in the reproducing channels $h_1 \ldots h_6$ are adjusted in any desired fashion to emphasize seismic waves in any selected frequency band. Also, if desired, the amplifiers $A_1^v \ldots A_6^v$ of the reproducing channels may be high-fidelity, broad-band amplifiers in order to produce accurate broad-band seismograms of the waves actually recorded on the magnetic tape M. The method employed in reproducing the magnetic tapes and recording seismograms is described briefly below.

When a seismic record on a magnetic tape M is to be reproduced and re-recorded, the power switch $E_0$ and the first motor switch $E_3$ are closed to cause the magnetic tape M to move along its path 12. The record-reproducer switch $E_7$ is left open, thereby disconnecting all of the channel relays $R_0 \ldots R_6$ from the power source so that these relays remain restored even though the sequence controller is operated. While it is not necessary to operate the sequence controller during reproduction of the records, nevertheless this may be done by simply closing the ready switch $E_1$. By virtue of the fact that switch $E_7$ is open, the channel relays $R_0 \ldots R_6$ remain restored, thus assuring that the record will not be erased accidentally.

Thereafter the adjustable filters of the output amplifiers $A'''$ are set to filter out any undesired frequency components of the waves and to emphasize any components which it is desired to record. The various electronic units in the reproducing channels $h$ are then energized preparatory to making a record.

Then the motor switch $E_5$ is closed, energizing the camera motor $m_1$ which drives the paper of the oscillograph O. In practice, the switch $E_5$ is closed at a time just after the splice P has passed the magnetic heads $D_0 \ldots D_6$. The passage of the splice P past the magnetic heads may be determined visually by watching the magnetic tape or by observing the movement of the beams of light reflected by the galvanometers onto the record paper, or by observing the indicator lights of the sequence controller. As soon as the camera motor $m_1$ is energized, it attains full speed quickly and the record paper moves past the beams of light reflected onto the paper from the galvanometers. The waves reproduced by the channels $h_0 \ldots h_6$ are recorded, forming a seismogram bearing traces that represent the signals that were recorded on the magnetic tape M. In practice, the oscillograph O may include a mechanism for recording timer lines on the seismogram to aid in correcting for any variations of motor speed before the time record from the magnetic tape becomes manifest. In any event, when the seismogram is made, seven traces are produced, each corresponding to the waves and other signals recorded on a corresponding track of the magnetic tape M.

One of the traces corresponding to the record made by recording the output of the auxiliary channel $h_0$ bears a time break TB, an indication of the first break FB corresponding to the first wave that arrives at the uphole seismometer $S_0$ and then a periodic waveform representing the signal impressed upon the magnetic tape M by the timer 310. Each of the traces represents the record produced on the corresponding track upon which the output of the corresponding recording channel H has been impressed.

Though there may be a gap in the timer trace so produced, the fact that the camera motor is operating at a constant speed makes it possible to extrapolate to the time break and to the first break, or either, to determine the times at which they occurred relative to the times of occurrence of various events indicated by the traces. The timer lines produced by the oscillograph O itself aid in this extrapolation in case the camera motor has not reached full speed before the time break TB or uphole first break.

Figure 6:
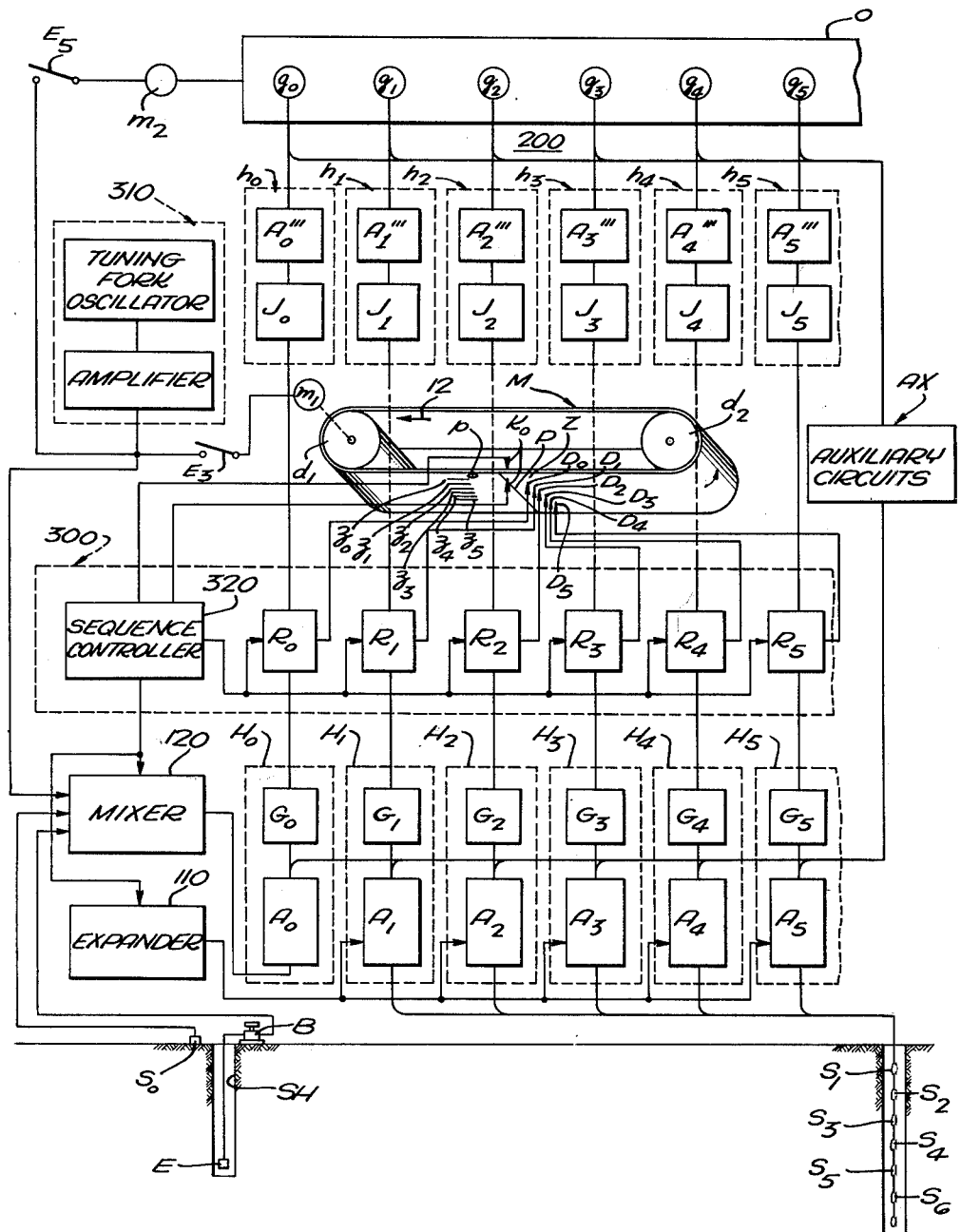
FIG. 6 is a schematic diagram of a modification of the invention.

If desired, in order to check the operation of the recorder 100, the outputs of the various amplifiers A may be connected to the galvanometer elements through auxiliary circuits AX, as illustrated schematically in FIG. 6. With this connection, an oscillographic record may be made simultaneously with a magnetic tape record. Thereafter, by setting the adjustable filters of the amplifiers A''' to pass a broad frequency band, the magnetic record may be reproduced by means of the oscillograph O and compared with the record previously obtained.

The adjustable filters of the various amplifiers A''' may be set at different values and corresponding records made by reproducing and recording signals from the magnetic tape.

While the apparatus described herein may be embodied in many different forms and may be employed in many other ways than that described, it will be clear that an improved system for recording and reproducing seismic records is provided by this invention. It is therefore to be understood that the invention is not limited to the specific embodiments thereof described and illustrated herein, but includes all forms thereof that come within the scope of the appended claims.

I claim:

1. In seismic prospecting apparatus:
an endless record belt;
driving means for driving said belt along a predetermined path;
a plurality of transducers mounted in a transducing area adjacent said path in operative relationship with different longitudinal zones of said belt;
a plurality of seismic wave recording channels having a series of mutually spaced seismometers in their respective inputs;
a corresponding plurality of reproducing channels having their outputs connected to corresponding recording elements of a multiple-element oscillograph, said seismic wave recording channels having a broad pass band;
adjustable filtering means in said reproducing channels, said adjustable filtering means being adapted to selectively emphasize waves in various frequency bands of seismic waves previously recorded on said endless record belt; and
relay means for selectively connecting said transducers to the outputs of the corresponding recording channels or to the inputs of the corresponding reproducing channels.

2. In seismic prospecting apparatus:
an endless record belt;
driving means for driving said belt along a predetermined path;
a plurality of transducers mounted in a transducing area adjacent said path in operative relationship with different longitudinal zones of said belt;
a plurality of seismic wave recording channels having a series of mutally spaced seismometers in their respective inputs, each of said recorder channels comprising a recording amplifier and a generator, the frequency of which is modulated in accordance with the output of the corresponding amplifier;
a corresponding plurality of reproducing channels having their outputs connected to corresponding recording elements of a multiple-element oscillograph, each of said reproducing channels comprising a demodulator and a reproducing amplifier;
and means for selectively connecting said transducing devices to the outputs of the corresponding recording channels or to the inputs of the corresponding reproducing channels.

3. Apparatus for recording and analyzing a seismic detector signal comprising means for generating a reference timing signal, a first recording medium, a second recording medium, means for recording said reference timing signal and said seismic detector signal on both said first and said second recording media, means for reproducing said detector signal and said timing signal from said first recording medium, means for modifying said reproduced seismic detector signal, and means for recording said modified seismic detector signal and said reproduced timing signal on said second recording medium, whereby said original seismic detector signal and said modified seismic detector signal are both recorded on said second recording medium and may be compared on the basis of a common timing signal.

4. Apparatus for recording and analyzing a seismic detector signal comprising means for generating a reference timing signal, a reproducible recording medium, a photographic recording medium, means for recording said reference timing signal and said seismic detector signal on both said reproducible recording medium and said photographic recording medium, means for reproducing said detector signal and said timing signal from said reproducible recording medium, means for modifying said reproduced seismic detector signal, and means for recording said modified seismic detector signal and said reproduced timing signal on said photographic recording medium, whereby said original seismic detector signal and said modified seismic detector signal are both recorded on said photographic recording medium and may be compared on the basis of a common timing signal.

5. Apparatus for recording and analyzing a seismic detector signal comprising means for generating a reference timing signal, a first recording medium, a second recording medium, means for recording said reference timing signal and said seismic detector signal on both said first and second recording media, means for reproducing said detector signal and said timing signal from said first recording medium, means for modifying said reproduced seismic detector signal, and means for recording said modified seismic detector signal and said reproduced timing signal on said second recording medium.

6. Apparatus for recording and analyzing a seismic detector signal comprising means for generating a reference timing signal, a reproducible recording medium, a photographic recording medium, means for recording said reference timing signal and said seismic detector signal on both said reproducible recording medium and said photographic recording medium, means for reproducing said detector signal and said timing signal from said reproducible recording medium, means for modifying said reproduced seismic detector signal, and means for recording said modified seismic detector signal and said reproduced timing signal on said photographic recording medium.

7. Apparatus for recording and analyzing a seismic detector signal comprising means for generating a reference timing signal, a first recording medium, a second recording medium, means for recording said reference timing signal simultaneously on both said first and second recording media, means for recording said seismic detector signal simultaneously on both said first and second recording media, means for reproducing said detector signal and said timing signal that have been recorded on said first recording medium, means for modifying said reproduced seismic detector signal, and means for recording said modified seismic detector signal and said reproduced timing signal on said second recording medium.

8. Apparatus for recording and analyzing a plurality of related seismic detector signals comprising means for generating a reference timing signal, a first recording medium, a second recording medium, means for recording said reference timing signal simultaneously on both said first and second recording media, means for recording said seismic detector signals simultaneously on both said first and second recording media and on separate tracks on each recording medium, means for reproducing said detector signals and said timing signal that have been recorded on said first recording medium, means for modifying said reproduced seismic detector signals, and means for recording said modified seismic detector signals and said reproduced timing signal on said second recording medium.

References Cited in the file of this patent

UNITED STATES PATENTS

| | | |
|---|---|---|
| 2,030,098 | Case | Feb. 11, 1936 |
| 2,088,588 | Dudley | Aug. 3, 1937 |
| 2,144,812 | Rieber | Jan. 24, 1939 |
| 2,248,293 | Woolf et al. | July 8, 1941 |
| 2,356,116 | Ridings | Aug. 15, 1944 |
| 2,367,049 | Petty | Jan. 9, 1945 |
| 2,378,388 | Begun | June 19, 1945 |
| 2,429,236 | Potter | Oct. 21, 1947 |
| 2,438,950 | Smith | Apr. 6, 1948 |
| 2,443,756 | Williams et al. | June 22, 1948 |
| 2,463,534 | Hawkins | Mar. 8, 1949 |
| 2,513,683 | Shaper et al. | July 4, 1950 |
| 2,589,035 | Begun et al. | Mar. 11, 1952 |
| 2,620,890 | Lee et al. | Dec. 9, 1952 |
| 2,767,389 | McCollum | Oct. 16, 1956 |
| 2,795,287 | Sharpe | June 11, 1957 |
| 2,950,459 | Loper | Aug. 23, 1960 |